(12) United States Patent
Dietrich et al.

(10) Patent No.: US 11,325,439 B2
(45) Date of Patent: May 10, 2022

(54) HEIGHT-ADJUSTABLE SPRING ARRANGEMENT FOR A VEHICLE

(71) Applicant: Bayerische Motoren Werke Aktiengesellschaft, Munich (DE)

(72) Inventors: Maximilian Dietrich, Seefeld (DE); Martin Riediger, Munich (DE); Uwe Schatzberger, Buch (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/261,222

(22) PCT Filed: Jun. 11, 2019

(86) PCT No.: PCT/EP2019/065182
§ 371 (c)(1),
(2) Date: Jan. 19, 2021

(87) PCT Pub. No.: WO2020/015924
PCT Pub. Date: Jan. 23, 2020

(65) Prior Publication Data
US 2021/0268859 A1    Sep. 2, 2021

(30) Foreign Application Priority Data

Jul. 20, 2018  (DE) .................. 10 2018 212 109.5

(51) Int. Cl.
*B60G 17/027* (2006.01)
*B60G 3/01* (2006.01)

(52) U.S. Cl.
CPC .......... *B60G 17/0272* (2013.01); *B60G 3/01* (2013.01); *B60G 2202/416* (2013.01);
(Continued)

(58) Field of Classification Search
CPC ................. B60G 17/0272; B60G 3/01; B60G 2202/416; B60G 2206/42; B60G 2500/30;
(Continued)

(56) References Cited

U.S. PATENT DOCUMENTS 2,571,449 A * 10/1951 Hobbs ..................... F16F 9/486
267/290
2,918,273 A * 12/1959 Whisler ............... B60G 15/062
267/34

(Continued)

FOREIGN PATENT DOCUMENTS

DE          32 02 740 A1      9/1983

OTHER PUBLICATIONS

International Search Report (PCT/ISA/210) issued in PCT Application No. PCT/EP2019/065182 dated Sep. 23, 2019 with English translation (four (4) pages).

(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A height-adjustable spring arrangement for a vehicle includes a bearing spring, a first limiting cylinder with a first limiting cylinder pot and a first limiting piston, a second limiting cylinder with a second limiting cylinder pot and a second limiting piston, and a guide cylinder with a guide cylinder pot, a displaceable guide piston in the guide cylinder pot and a guide piston rod fixed on the guide piston and extending out of the guide cylinder pot along a longitudinal axis of a bearing spring and through the bearing spring. The guide piston rod is displaceable by the first and second limiting cylinders such that a spring preload acting on the bearing spring and a negative spring path of the bearing spring remain constant as a result of a height adjustment.

9 Claims, 2 Drawing Sheets

(52) U.S. Cl.
CPC .. *B60G 2204/4232* (2013.01); *B60G 2206/42* (2013.01); *B60G 2500/30* (2013.01)

(58) Field of Classification Search
CPC .......... B60G 2202/413; B60G 2202/44; B60G 2204/16; B60G 2800/914; B60G 15/061; B60G 2204/4232; F16F 9/56; F16F 1/121; F16F 9/103
See application file for complete search history.

(56) References Cited

U.S. PATENT DOCUMENTS

| | | | | |
|---|---|---|---|---|
| 3,628,810 A * | 12/1971 | Graef | ................ | B60G 17/0272 280/6.159 |
| 4,162,091 A * | 7/1979 | Sano | ................ | B60G 15/00 188/266.2 |
| 4,368,878 A * | 1/1983 | Meller | ................ | B60G 17/044 267/64.17 |
| 4,635,765 A * | 1/1987 | Schmidt | ................ | F16F 9/46 188/266.3 |
| 5,009,451 A * | 4/1991 | Hayashi | ................ | B60G 17/0272 180/219 |
| 5,022,501 A * | 6/1991 | Hayashi | ................ | B60G 17/0272 188/285 |
| 5,096,168 A * | 3/1992 | Takehara | ................ | B60G 15/065 267/152 |
| 5,560,456 A * | 10/1996 | Koch | ................ | E05C 17/305 188/300 |
| 5,810,335 A * | 9/1998 | Wirtz | ................ | B60G 17/0272 267/221 |
| 6,193,223 B1 * | 2/2001 | Jackson | ................ | F16F 9/185 267/64.12 |
| 6,296,089 B1 * | 10/2001 | Koch | ................ | F16F 9/56 188/300 |
| 6,520,524 B1 * | 2/2003 | Costa | ................ | B60G 17/0416 280/276 |
| 6,676,119 B2 * | 1/2004 | Becker | ................ | B60G 17/0272 267/177 |
| 7,520,494 B2 * | 4/2009 | Gaile | ................ | B60G 17/01933 188/322.21 |
| 7,641,181 B2 * | 1/2010 | Delorenzis | ................ | F16F 9/43 267/64.13 |
| 7,976,030 B2 * | 7/2011 | Michel | ................ | B60G 7/04 280/6.157 |
| 8,109,371 B2 * | 2/2012 | Kondo | ................ | B60G 15/063 188/266.3 |
| 8,127,900 B2 * | 3/2012 | Inoue | ................ | F16F 15/03 188/267 |
| 8,196,721 B2 * | 6/2012 | Gabriel | ................ | B60G 17/002 188/274 |
| 8,215,620 B2 * | 7/2012 | Krauss | ................ | B62K 25/04 267/64.17 |
| 8,602,429 B2 * | 12/2013 | Nguyen | ................ | F16F 9/56 280/124.162 |
| 8,616,352 B2 * | 12/2013 | Hinouchi | ................ | F16H 25/20 188/321.11 |
| 8,616,563 B2 * | 12/2013 | Lee | ................ | B60G 17/0272 280/5.514 |
| 8,641,052 B2 * | 2/2014 | Kondo | ................ | B60G 11/58 280/5.514 |
| 8,783,696 B2 * | 7/2014 | Murakami | ................ | B60G 13/08 280/5.514 |
| 8,807,574 B2 * | 8/2014 | Kohlhauser | ................ | B60G 17/00 280/5.51 |
| 8,844,944 B1 * | 9/2014 | Murakami | ................ | B60G 17/0165 280/5.514 |
| 8,905,409 B2 * | 12/2014 | Murakami | ................ | B62J 45/41 280/5.514 |
| 9,004,500 B2 * | 4/2015 | Murakami | ................ | B60G 17/0272 280/5.514 |
| 9,016,700 B2 * | 4/2015 | Murakami | ................ | B60G 17/0272 280/6.157 |
| 9,162,548 B1 * | 10/2015 | Wakeman | ................ | B60G 15/063 |
| 9,352,631 B2 * | 5/2016 | Mochizuki | ................ | F16F 9/56 |
| 9,527,365 B2 * | 12/2016 | Mochizuki | ................ | F16F 9/56 |
| 9,541,151 B2 * | 1/2017 | Martin | ................ | F16F 9/3271 |
| 9,623,713 B2 * | 4/2017 | Wolf-Monheim | .... | F16F 1/3615 |
| 9,669,674 B2 * | 6/2017 | Luczak | ................ | B60G 15/065 |
| 9,914,335 B1 * | 3/2018 | Lin | ................ | B60G 15/063 |
| 10,562,365 B2 * | 2/2020 | Schmidt | ................ | F16F 9/065 |
| 2009/0230640 A1 * | 9/2009 | Michel | ................ | B60G 15/068 280/6.157 |
| 2014/0077466 A1 | 3/2014 | Murakami et al. | | |
| 2014/0175764 A1 * | 6/2014 | Murakami | ................ | B60G 17/015 280/5.514 |
| 2016/0200162 A1 | 7/2016 | Luczak et al. | | |

OTHER PUBLICATIONS

German-language Written Opinion (PCT/ISA/237) issued in PCT Application No. PCT/EP2019/065182 dated Sep. 23, 2019 (six (6) pages).

* cited by examiner

HEIGHT-ADJUSTABLE SPRING ARRANGEMENT FOR A VEHICLE

BACKGROUND AND SUMMARY OF THE INVENTION

The invention relates to a height-adjustable spring arrangement for a motor vehicle.

The prior art has already disclosed a multiplicity of different spring arrangements for motor vehicles, which spring arrangements are height-adjustable and, as a result, make a driving position change or driving position setting of the vehicle possible.

In particular, in the case of single track motor vehicles, such as motorcycles, for example, the driving position or ride height of the vehicle has a great influence on the driving behavior and the steering geometry. Both the stability and the handling of the vehicle are greatly dependent on the driving position, the motor vehicles usually being designed for a predefined setpoint driving position.

Most of the spring arrangement in motor vehicles have a bearing spring with a segment-specific stroke behavior, which bearing spring is clamped in between spring collars or spring mountings. The bearing spring can rebound out of its starting position by what is known as the negative spring travel, and can compress by the positive spring travel. The negative and the positive spring travel result in total in the overall spring travel of the bearing spring.

The spring arrangement or the bearing spring is initially loaded with a spring prestress. The latter is a parameter for setting the spring force of the bearing spring in the normal position of the vehicle or in the setpoint driving position. In order to set the spring prestress, the starting position of the suspension operation and the proportions of the negative and positive spring travel in the overall spring travel are modified. The spring prestress can be set, for example, by way of displacement of the spring collar or spring mounting along the longitudinal axis of the bearing spring.

In the case of the height-adjustable spring arrangements which are known in the prior art, however, it can occur that the negative spring travel of the spring becomes so great as a result of lowering of the driving position of the vehicle and the effective spring prestress becomes so small that a minimum value of the spring prestress is undershot. As a result of the reduction of the spring prestress and the undershooting of the minimum value, the bearing spring can be damaged in the case of rebound, that is to say in the case of a spring movement along the negative spring travel, or can cause a negative driving behavior of the motor vehicle. For example, as a result of the excessively small spring prestress, the bearing spring can slip from the spring mounting or spring collar during rebound, as a result of which an asymmetrical introduction of spring force into the motor vehicle can occur in the case of a subsequent load. Furthermore, acoustically perceivable noise which can unsettle the driver of the motor vehicle occurs.

In the case of conventional height-adjustable spring arrangements, this usually occurs when the adjustment travel, along which the height of the spring arrangement can be adjusted, is greater than a spring prestressing travel, along which the starting position of the bearing spring and therefore the spring prestress can be set.

As a result of the lowering of the driving position, the ratio of the positive/negative spring travel is usually changed in the case of conventional spring arrangements. The positive spring travel is reduced by the lowered height, and the negative spring travel is increased by the same magnitude. This increase in the negative spring travel leads in the case of rebound to the bearing spring becoming prestress-free and it being possible for it to be released from its spring mounting.

Therefore, the invention is based on the object of providing a height-adjustable spring arrangement, by way of which the height of the spring arrangement or a driving position of a vehicle can be set, the spring prestress and the negative spring travel of a bearing spring of the spring arrangement remaining constant at the same time.

According to the invention a height-adjustable spring arrangement for a vehicle, in particular a single track motor vehicle, is proposed. The spring arrangement has a bearing spring, a first limiting cylinder, a second limiting cylinder and a guide cylinder. The first limiting cylinder comprises a first limiting cylinder pot and a first limiting piston, and the second limiting cylinder comprises a second limiting cylinder pot and a second limiting piston. The guide cylinder has a guide cylinder pot, a guide piston which is mounted displaceably in the guide cylinder pot, and a guide piston rod. The guide piston rod is fixed on the guide piston and extends out of the guide cylinder pot along a longitudinal axis of the bearing spring and through the bearing spring. The first limiting cylinder is fixed on the guide piston rod on a section of the guide piston rod which is spaced apart from the guide piston along the longitudinal axis. Furthermore, the first limiting cylinder defines a first bearing spring mounting, on which the bearing spring is mounted. The first bearing spring mounting can be fixed or arranged, for example, on the first limiting cylinder or, as an alternative, can be configured by the latter. As a counterpart to the first bearing spring mounting, the guide cylinder pot defines a second bearing spring mounting, on which the bearing spring is mounted. The second bearing spring mounting can be fixed or arranged on the guide cylinder pot or, as an alternative, can be configured by the latter. The bearing spring is clamped in with a spring prestress between the first and the second bearing spring mounting. The guide piston rod can be displaced by means of the first and second limiting cylinder, as a result of which the height of the spring arrangement can be adjusted. Here, the spring prestress which acts on the bearing spring and a negative spring travel of the bearing spring remain constant, along which negative spring travel the bearing spring can rebound away from the second bearing spring mounting.

The first limiting cylinder is configured, in particular, as a linear drive, and the second limiting cylinder is configured as an equalizing vessel which at the same time limits the movability of the bearing spring along the negative spring travel. In order to raise the vehicle, a fluid, such as oil or air, for example, can be pumped by way of a pump out of the second limiting cylinder into the first limiting cylinder, as a result of which the first limiting piston is displaced with respect to the first limiting cylinder pot, and the guide piston rod is displaced, and the height of the spring arrangement is increased. In order to lower the spring arrangement, a force, for example the weight of the vehicle, acts on the first limiting cylinder, as a result of which the fluid is pumped out of the first limiting cylinder into the second limiting cylinder. Here, the second limiting cylinder limits the negative spring travel in a manner which is dependent on the fluid which is pumped out of the first limiting cylinder.

The height of the spring arrangement is the dimension of the spring arrangement along the longitudinal axis of the bearing spring, it being possible for the height to be reduced by way of a retraction of the guide piston rod and to be increased by way of an extension of the guide piston rod. A reduction of the height leads to lowering and an increase leads to raising of the driving position of the respective vehicle.

One advantageous design variant of the spring arrangement provides that the bearing spring, the first limiting cylinder, the second limiting cylinder and the guide cylinder are arranged concentrically with respect to one another.

In the case of one advantageous development, the second limiting cylinder has a guide piston stop face which limits a stroke section, along which the guide piston can be displaced in the guide cylinder pot along the longitudinal axis. Starting from its initial position in the guide cylinder pot, the guide piston can carry out a negative stroke toward the bearing spring and a positive stroke away from the bearing spring. The negative stroke of the guide piston limits and defines the negative spring travel of the bearing spring, and the positive stroke limits and defines the positive spring travel of the bearing spring. The guide piston stop face moves, for example, together with the guide piston, and limits the negative stroke by virtue of the fact that the guide piston stop face comes to bear against a stop which is fixed on the guide cylinder pot. Therefore, by way of an adjustment of the guide piston stop face along the longitudinal axis, the negative stroke of the guide piston and, as a result, the negative spring travel of the bearing spring can be limited and set.

The second limiting piston is preferably configured integrally with the guide piston, as a result of which the second limiting cylinder and the guide cylinder form one structural unit, and the second limiting cylinder can be displaced by way of the guide piston in the guide cylinder pot. The second limiting cylinder pot has the guide piston stop face on a side which faces the bearing spring. Therefore, the second limiting cylinder moves together with the guide piston, with the result that the second limiting cylinder and the guide piston can be considered jointly to be a piston which can be moved in the guide cylinder pot.

Therefore, in the case of a further advantageous design variant, the second limiting cylinder is arranged completely in the guide cylinder pot. The interior of the guide cylinder pot is divided by way of its guide piston with the second limiting cylinder into two fluid chambers which, however, are preferably connected in flow terms, and the guide piston is substantially undamped in the guide cylinder pot in the case of a movement along the longitudinal axis.

One advantageous development of the spring arrangement additionally provides that the first limiting cylinder has a first fluid chamber which is formed by way of the first limiting cylinder pot and the first limiting piston, and the second limiting cylinder has a second fluid chamber which is formed by way of the second limiting cylinder pot and the second limiting piston. The first fluid chamber and the second fluid chamber are connected in terms of flow by way of a fluid channel, with the result that fluid can flow through the fluid channel between the first and the second fluid chamber.

It is provided in the case of one development which is likewise advantageous that it is possible for a volume of the first fluid chamber to be varied by way of a displacement of the first limiting piston relative to the first limiting cylinder pot, and it is possible for a volume of the second fluid chamber to be varied by way of a displacement of the second limiting piston relative to the second limiting cylinder pot. It is possible for the guide piston rod to be displaced along the longitudinal axis by way of a change of the volume of the first fluid chamber and of the volume of the second fluid chamber, the negative spring travel preferably remaining identical as a result of a displacement of the guide piston stop face. A change of the volume of the first fluid chamber leads via the fluid channel to a change of the volume of the second fluid chamber by the same amount, the respective limiting piston being displaced by the same distance relative to the respective limiting cylinder pot. Therefore, the volume change of the first fluid chamber leads to a displacement of the guide piston rod and at the same time to a displacement of the guide piston stop face, with the result that, in the case of an adjustment of the height of the spring arrangement, the negative stroke is at the same time reset and, as a result, the negative spring travel remains constant.

In order to make the displacement of the guide piston rod by way of the change of the volume of the first limiting cylinder possible, the first limiting cylinder pot is fixed on the guide piston rod, the first limiting piston forming the first bearing spring mounting. As an alternative, the first limiting piston is fixed on the guide piston rod, the first limiting cylinder pot forming the first bearing spring mounting.

For the space-saving connection in flow terms of the first fluid chamber to the second fluid chamber, the guide piston rod is configured at least in sections as a tube in one advantageous design variant. Furthermore, the fluid channel is arranged in the tube or is formed by way of the tube.

As a result of a leak at the first fluid chamber, the second fluid chamber or at the fluid channel, it can occur that sufficient fluid is no longer present in the fluid system which consists of the first fluid chamber, the second fluid chamber and the fluid channel. In order to compensate for leakage losses, one advantageous variant of the invention provides that the spring arrangement has a check valve. Furthermore, the guide cylinder has a third fluid chamber in its guide cylinder pot, the third fluid chamber being connected in flow terms by way of the check valve to the first fluid chamber, the second fluid chamber and/or the fluid channel. The check valve shuts off a fluid flow or a fluid stream into the third fluid chamber, with the result that a fluid can flow only out of the third fluid chamber into the second fluid chamber or the fluid channel.

In order to actually pump fluid out of the guide cylinder only when a leak has taken place in the first fluid chamber, the second fluid chamber or the fluid channel, one embodiment of the invention provides that the check valve has a restoring spring which is configured to shut off a fluid flow from the third fluid chamber until a predefined negative pressure is reached in the second fluid chamber and/or the fluid channel. The restoring spring opens the flow path through the check valve only when sufficient fluid cannot be pumped into the first fluid chamber and, as a result, a negative pressure is produced in the second fluid chamber or in the fluid channel.

In a further advantageous variant, the spring arrangement comprises a fluid pump and an actuating valve for the height adjustment and control of the fluid flow. The fluid pump is configured, with the actuating valve in a first position, to pump a fluid out of the second fluid chamber through the actuating valve into the first fluid chamber. As a result, the guide cylinder rod is preferably displaced along the longitudinal axis, and the height of the spring arrangement is changed.

In accordance with a further aspect of the invention, a suspension fork with a first fork leg and a second fork leg is proposed, a spring arrangement according to the invention being arranged in the first fork leg, and a damper being arranged in the second fork leg. Here, the first fork leg provides the spring action, and the second fork leg provides the damping action of the suspension fork.

Moreover, a method for adjusting the driving position of a vehicle with a spring arrangement according to the invention is additionally proposed. In the case of the method, the vehicle is lowered from a first driving position, by the actuating valve being moved into a second position. At least a weight of the vehicle acts on the spring arrangement along the longitudinal axis, as a result of which a fluid is pressed out of the first limiting cylinder through the actuating valve and the fluid channel into the second limiting cylinder by way of the weight. As a result, the guide piston rod is displaced along the longitudinal axis into the guide cylinder pot. Furthermore, the vehicle is lifted out of a second driving position, by the actuating valve being moved into a first position. A fluid is pumped by way of a pump out of the second limiting cylinder through the actuating valve and the fluid channel into the first limiting cylinder, as a result of which the guide piston rod is displaced along the longitudinal axis out of the guide cylinder pot. The guide piston stop face is preferably displaced parallel to the displacement of the guide piston rod in the respective opposite direction by the same amount, with the result that the guide piston stop face maintains its position with respect to the guide cylinder pot as viewed in absolute terms.

The guide piston rod can be displaced by approximately 40 mm along the longitudinal axis by way of the limiting cylinders or by way of the first limiting cylinder. The lowering and the lifting can take place in each case continuously, it being possible, for example, by way of a third position of the valve for the fluid flow between the first and the second fluid chamber to be shut off and the displacement of the guide piston rod to be stopped, with the result that intermediate positions can be moved to or set. The pumping of the fluid into the first fluid chamber until the first fluid chamber is filled completely requires approximately 10 seconds, the lowering, that is to say the pressing of the fluid into the second fluid chamber, requiring less than one second.

A fluid which has a positive pressure with respect to a fluid in the first and/or the second fluid chamber is preferably arranged in the third fluid chamber.

The second position of the valve, in which second position the spring arrangement or the cylinder piston rod is lowered, preferably corresponds to a basic position of the valve, into which basic position said valve returns, for example, in a spring-actuated manner as soon as the valve is no longer actuated. In the case of a failure of the controller or a power failure, the vehicle is lowered automatically as a result.

The displacement of the guide piston rod leads to a driving position change, it not being necessary for the quantitative displacement of the guide piston rod to correspond to the driving position change. If, for example, in each case one spring arrangement according to the invention is provided in the two fork legs of the suspension fork, a displacement of equal magnitude of the two guide piston rods corresponds to the ride level change or the driving position change of the vehicle. If a spring arrangement according to the invention is provided in only one fork leg and not in the other fork leg, the displacement of the guide piston rod leads to a driving position change which corresponds to half the displacement of the guide piston rod.

The features which are disclosed above can be combined in any desired manner, in so far as this is technically possible and they are not inconsistent with one another.

Other advantageous developments of the invention are characterized in the subclaims and/or will be shown in greater detail in the following text together with the description of the preferred implementation of the invention on the basis of the figures.

DETAILED DESCRIPTION

The figures are diagrammatic by way of example. Identical designations in the figures indicate identical functional and/or structural features.

Figure 1:
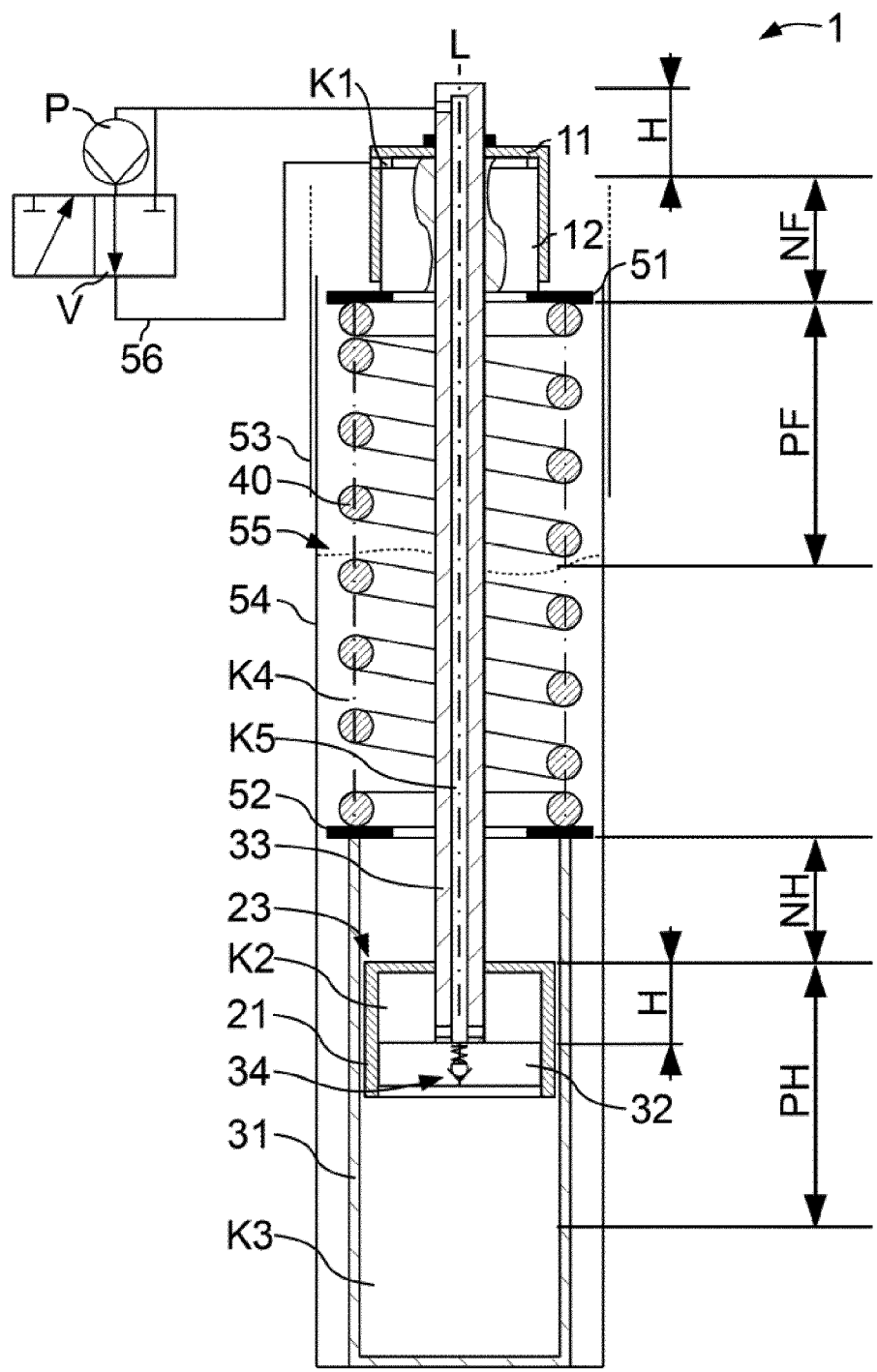
FIG. 1 shows a sectional illustration of a spring arrangement in accordance with an embodiment of the present invention in a retracted state.
Figure 2:
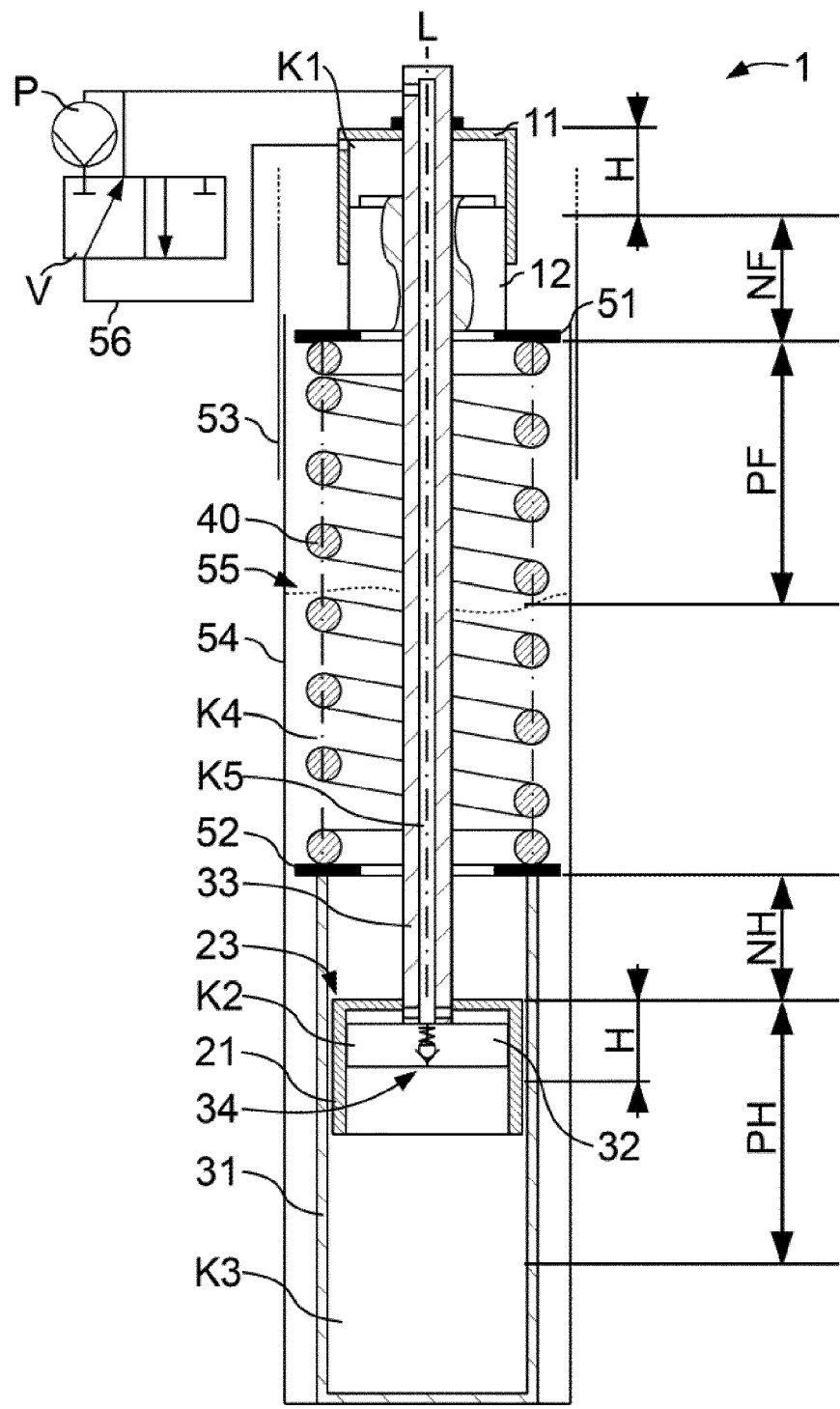
FIG. 2 shows a sectional illustration of the FIG. 1 spring arrangement in an extended state.

FIGS. 1 and 2 each show an embodiment of the spring arrangement 1 according to the invention, wherein all components are illustrated in half-section.

The spring arrangement 1 is arranged in a stationary tube 54 and in a sliding tube 53 which surrounds the stationary tube 54. Furthermore, the spring arrangement 1 is formed substantially by way of a first limiting cylinder, a second limiting cylinder, a guide cylinder and a bearing spring 40. The guide cylinder has a guide cylinder pot 31 which is arranged in the stationary tube 54 and is open on one side. A guide piston is arranged in the guide cylinder pot 31, on which guide piston the guide piston rod 33 is fixed which extends out of the guide cylinder pot 31 on the open side of the guide cylinder pot 31, and extends through the bearing spring 40.

The first limiting cylinder is arranged on the guide piston rod 33 on that side of the latter which is spaced apart from the guide piston. The bearing spring 40 is prestressed with a spring prestressing force between the first limiting cylinder and the guide cylinder pot 31. The second limiting cylinder is arranged directly on the guide piston, and is moved with the latter. The second limiting piston of the second limiting cylinder is configured integrally with the guide piston as a piston 32. The second limiting cylinder pot 21 is sealed with respect to the piston 32 and the guide piston rod 33. On a side of the second limiting cylinder pot 21 which faces the bearing spring 40, said second limiting cylinder pot 21 has a guide piston stop face 23 which limits the displacement capability of the guide piston or the piston 32 and the guide cylinder rod 33 along the longitudinal axis L of the bearing spring 40 toward the bearing spring 40.

The first limiting cylinder has a first limiting cylinder pot 11 and a first limiting piston 12, the first limiting cylinder pot 11 being fixed on the guide piston rod 33, and it being possible for the first limiting piston 12 to be displaced with respect to the limiting cylinder pot 11.

The guide piston rod 33 extends both through the first limiting cylinder and through the second limiting cylinder, the limiting cylinders being sealed with respect to the guide piston rod 33.

The bearing spring 40 bears in the direction of its longitudinal axis L against a first spring collar 51 and a second spring collar 52. In the case of the exemplary embodiment which is shown, the second spring collar 52 is supported on the guide cylinder pot 31 and forms the second bearing spring mounting. The first spring collar 51 is supported on the opposite side of the bearing spring 40 on the first limiting piston 12 and forms the first bearing spring mounting. The bearing spring 40 can compress along its longitudinal axis L over a positive spring travel PF, and can rebound over a negative spring travel NF, said spring travel being limited in each case by way of the displacement capability of the piston 32 in the guide cylinder pot 31. The piston 32 can correspondingly be displaced in the guide cylinder pot 31 by a positive stroke PF, which limits the compressing of the bearing spring 40 from its starting position along its positive spring travel PF, and by a negative stroke NF, which limits the rebound of the bearing spring 40 out of its starting position along its negative spring travel NF.

A first fluid chamber K1 is defined in the first limiting cylinder by way of the first limiting cylinder pot 11 and the first limiting piston 12, the volume of which first fluid chamber K1 can be varied by way of a displacement of the first limiting piston 12. The first fluid chamber K1 is connected in flow terms to a fluid channel K5 via a valve V and a pump P, and via fluid lines 56. In the case of the exemplary embodiment which is shown, the guide piston rod 33 is configured to be hollow or is configured as a tube which forms the fluid channel K5. A second fluid chamber K2 of the second limiting cylinder is defined in the guide cylinder pot 31 by way of the piston 32 and the second limiting cylinder pot 21. On its side which faces away from the piston 32, the fluid channel K5 is connected in fluid terms to the first fluid chamber K1 and, on its side which faces the piston 32, is connected to the second fluid chamber K2, with the result that a fluid can flow via the pump P and the valve V in a first position or the valve V in a second position between the first fluid chamber K1 and the second fluid chamber K2.

In addition, a third fluid chamber K3 is defined in the interior of the guide cylinder pot 31, in which third fluid chamber K3 the piston 32 moves with the second limiting cylinder pot 21. Furthermore, the third fluid chamber K3 is connected in fluid terms via the open side of the guide cylinder pot 31 to a fourth fluid chamber K4 which is defined in the stationary tube 54. The fourth fluid chamber K4 or the interior of the stationary tube 54 is filled with oil or another suitable fluid up to the fluid limit 55, but can also be filled completely.

If the height of the spring arrangement 1 is to be increased, for example, by the distance H, in order to raise the vehicle out of a second driving position, the valve is moved into a first position which corresponds to the position of the valve in FIG. 1. A fluid is pumped by way of the pump P out of the second fluid chamber K2 through the fluid channel K4 through the valve V into the first fluid chamber K1. As a result, the volume of the first fluid chamber K1 increases, and the first limiting piston 12 moves out of the first limiting cylinder pot 11. In the construction which is shown, this leads to a displacement along the longitudinal axis L of the first limiting cylinder pot 11 away from the piston 32. Since the first limiting cylinder pot 11 is fixed on the guide piston rod 33, the latter is displaced with the first limiting cylinder pot 11 along the longitudinal axis L. At the same time, the volume of the second fluid chamber K2 is reduced, as a result of which the second limiting cylinder pot 21 is displaced along the longitudinal axis L away from the bearing spring 40. The displacement of the second limiting cylinder pot 21 or the displacement of the guide piston stop face 23 on the second limiting cylinder pot 21 compensates for the displacement of the guide piston rod 33, with the result that the guide piston stop face 23 which is configured on a side of the second limiting cylinder pot 21 which faces the bearing spring 40 is not displaced, or its position remains constant. As a result, the negative stroke and the positive stroke of the piston 32 are kept constant as measured from the guide piston stop face 32, with the result that the negative spring travel NF and the positive spring travel PF also remain constant, and the guide piston rod 33 is displaced along the longitudinal axis L by the distance H out of the guide cylinder pot 31.

The spring arrangement 1 which is shown in FIG. 2 corresponds to the spring arrangement from FIG. 1, but the guide piston rod 33 has been displaced completely by the distance H out of the guide cylinder pot 31. Furthermore, the valve is situated in a second position. The fluid is pressed out of the first fluid chamber K1 through the valve and the fluid channel K5 into the second fluid chamber K2 by way of the weight of the vehicle, a weight of the driver and possible driving forces which act on the spring arrangement along the longitudinal axis.

It becomes clear in comparison with the spring arrangement from FIG. 1 that, although the guide piston rod 33 has been displaced by the distance H, the positive spring travel PF and the negative spring travel NF have remained identical. They are still limited by way of the displacement capability of the piston 32 in the guide cylinder pot 31, with the result that a height setting of the spring arrangement is possible without a change of the spring travels.

If a leakage loss should occur in the fluid system which is formed by way of the first fluid chamber K1, the second fluid chamber K2, the fluid channel K5, the pump P, the valve V and the fluid lines 56, a check valve 34 is provided in the piston 32 in the case of the spring arrangements 1 which are shown in FIG. 1 and FIG. 2. The check valve 34 shuts off a fluid flow out of the fluid system into the third and fourth fluid chamber K3, K4, and permits a fluid flow or fluid stream out of the third fluid chamber K3 into the fluid system only if fluid can no longer be pumped out in the second fluid chamber K2 by way of the pump and the leakage losses, and therefore a sufficiently high negative pressure is produced in order to at least compensate for the restoring force of a restoring spring of the check valve 34, with the result that the check valve 34 releases the throughflow or the flow of the fluid out of the third fluid chamber K3 into the second fluid chamber K2 and into the fluid channel K5.

The implementation of the invention is not restricted to the preferred exemplary embodiments which are indicated in the preceding text. Rather, a number of variants are conceivable which utilize the depicted solution even in the case of embodiments of a fundamentally different type.

What is claimed is:

1. A height-adjustable spring arrangement for a vehicle, comprising:
   a bearing spring;
   a first limiting cylinder with a first limiting cylinder pot and a first limiting piston;
   a second limiting cylinder with a second limiting cylinder pot and a second limiting piston; and
   a guide cylinder with a guide cylinder pot, a displaceable guide piston arranged in the guide cylinder pot, and a guide piston rod fixed on the guide piston and extending out of the guide cylinder pot along a longitudinal axis of the bearing spring and through the bearing spring,
   wherein
      the first limiting cylinder is fixed on the guide piston rod on a section of the guide piston rod spaced apart along the longitudinal axis from the guide piston,
      the first limiting cylinder forming a first bearing spring mounting against which the bearing spring bears,
      the guide cylinder pot forming a second bearing spring mounting against which the bearing spring bears the bearing spring is clamped between the first and the second bearing spring mounting with a spring prestress, when the guide piston rod is displaced with the first and second limiting cylinder, the bearing spring prestress and a negative spring travel of the bearing spring remain constant relative to the bearing spring prestress and the negative spring travel before the guide rod piston is displaced, the bearing spring, the first limiting cylinder, the second limiting cylinder and the guide cylinder are arranged concentrically with respect to one another, the second limiting cylinder has a guide piston stop face configured to limit a stroke section along which the guide piston is displaceable along the longitudinal axis in the guide cylinder pot, the second limiting piston is configured integrally with the guide piston, the second limiting cylinder pot has the guide piston stop face on a side of the second limiting cylinder pot which faces the bearing spring, the second limiting cylinder is arranged completely in the guide cylinder pot, the first limiting cylinder includes a first fluid chamber formed by the first limiting cylinder pot and the first limiting piston, the second limiting cylinder includes a second fluid chamber formed by the second limiting cylinder pot and the second limiting piston, and the first fluid chamber and the second fluid chamber are fluidly connected by a fluid channel.

2. A suspension fork, comprising:
a first fork leg;
a second fork leg; and
a spring arrangement according to claim 1,
wherein the spring arrangement is arranged in the first fork leg and a damper is arranged in the second fork leg.

3. The spring arrangement according to claim 1, wherein
a displacement of the first limiting piston relative to the first limiting cylinder pot causes a volume of the first fluid chamber to be varied,
a displacement of the second limiting piston relative to the second limiting cylinder pot causes a volume of the second fluid chamber to be varied, and
the guide piston rod is displaced along the longitudinal axis by a change of the volume of the first fluid chamber and a change of the volume of the second fluid chamber.

4. The spring arrangement according to claim 3, wherein
the first limiting cylinder pot is fixed on the guide piston rod,
the first limiting piston forms the first bearing spring mounting, or the first limiting cylinder pot forms the first bearing spring mounting and the first limiting piston is fixed on the guide piston rod.

5. The spring arrangement according to claim 4, wherein
the guide piston rod is configured at least in sections as a tube, and
the fluid channel between the first fluid chamber and the second fluid chamber is arranged in the tube or being formed by the tube.

6. The spring arrangement according to claim 5, further comprising:
a check valve,
wherein
the guide cylinder has a third fluid chamber in the guide cylinder pot,
the third fluid chamber is fluidly via the check valve to the first fluid chamber, the second fluid chamber, the fluid channel, or a combination of any of the first fluid chamber, the second fluid chamber and the fluid channel, and
the check valve is configured to shut off a fluid flow into the third fluid chamber.

7. The spring arrangement to claim 6, wherein
the check valve has a restoring spring configured to shut off the fluid flow from the third fluid chamber until a predefined negative pressure is reached in the second fluid chamber, in the fluid channel or the second fluid chamber and the fluid channel.

8. The spring arrangement according to claim 7, further comprising:
a fluid pump; and
an actuating valve,
wherein the fluid pump is configured to pump fluid out of the second fluid chamber through the actuating valve into the first fluid chamber when the actuating valve is in a first position.

9. A method for adjusting the driving position of a vehicle with a spring arrangement according to claim 8 which is acted upon by a weight of the vehicle along the longitudinal axis, comprising the acts of:
lowering the vehicle from a first driving position by moving the actuating valve into a second position,
pressing fluid out of the first limiting cylinder through the actuating valve and the fluid channel into the second limiting cylinder using the vehicle weight, and
displacing the guide piston rod along the longitudinal axis into the guide cylinder pot, and
lifting the vehicle out of a second driving position, by moving the actuating valve into a first position,
pumping fluid with the pump out of the second limiting cylinder through the actuating valve and the fluid channel into the first limiting cylinder, and
displacing the guide piston rod along the longitudinal axis out of the guide cylinder pot.

* * * * *